(12) United States Patent
Koikegami et al.

(10) Patent No.: US 12,040,729 B2
(45) Date of Patent: Jul. 16, 2024

(54) MOTOR CONTROL DEVICE

(71) Applicants: Nidec Elesys Corporation, Kawasaki (JP); Nidec Corporation, Kyoto (JP)

(72) Inventors: Takashi Koikegami, Kawasaki (JP); Isao Sanbonmatsu, Kawasaki (JP); Akihiro Okamura, Kawasaki (JP); Tomohiro Fukumura, Kyoto (JP); Kotaro Kataoka, Kyoto (JP)

(73) Assignees: NIDEC CORPORATION, Kyoto (JP); NIDEC ELESYS CORPORATION, Kanagawa (JP)

( * ) Notice: Subject to any disclaimer, the term of this patent is extended or adjusted under 35 U.S.C. 154(b) by 208 days.

(21) Appl. No.: 17/847,227

(22) Filed: Jun. 23, 2022

(65) Prior Publication Data
US 2022/0416712 A1 Dec. 29, 2022

(30) Foreign Application Priority Data
Jun. 25, 2021 (JP) ................................ 2021-106096

(51) Int. Cl.
*H02P 27/08* (2006.01)
*H02K 5/16* (2006.01)
*H02K 11/30* (2016.01)
*H02P 6/08* (2016.01)

(52) U.S. Cl.
CPC ............ *H02P 27/08* (2013.01); *H02K 5/16* (2013.01); *H02K 11/30* (2016.01); *H02P 6/08* (2013.01)

(58) Field of Classification Search
CPC .......... H02P 27/085; H02P 21/22; H02P 6/08; H02P 6/15; H02P 6/10; H02P 27/12; H02P 27/08; H02P 21/18; H02M 7/5387; H02M 1/385; B62D 5/0463; H02K 11/30; H02K 5/16
See application file for complete search history.

(56) References Cited

U.S. PATENT DOCUMENTS

| | | | | |
|---|---|---|---|---|
| 2016/0308477 | A1* | 10/2016 | Lim | ........................ H02P 6/16 |
| 2020/0195167 | A1* | 6/2020 | Ogawa | ................... H02P 27/08 |
| 2022/0140766 | A1* | 5/2022 | Shouji | .................. H02P 27/085 |
| | | | | 318/504 |

FOREIGN PATENT DOCUMENTS

JP 3447366 B2 9/2003

* cited by examiner

*Primary Examiner* — Said Bouziane
(74) *Attorney, Agent, or Firm* — Keating & Bennett, LLP

(57) ABSTRACT

A motor control device includes an inverter circuit to convert a DC power source voltage into a three-phase AC voltage and supply the three-phase AC voltage to the three-phase motor and a controller to generate three-phase PWM signals based on three-phase duty command values updated at a predetermined updating cycle and control the inverter circuit based on the three-phase PWM signals. The controller is configured or programmed to shift, when duty command values of at least two phases of the three-phase duty command values updated at a first update timing are the same, the duty command value of one phase of the duty command values of the two phases by a predetermined shift amount and shifts a duty command value of the one phase of the three-phase duty command values updated at a second update timing which is an update timing next to the first update timing by the shift amount in a direction opposite to a shift direction at the first update timing.

6 Claims, 7 Drawing Sheets

[Fig. 1]
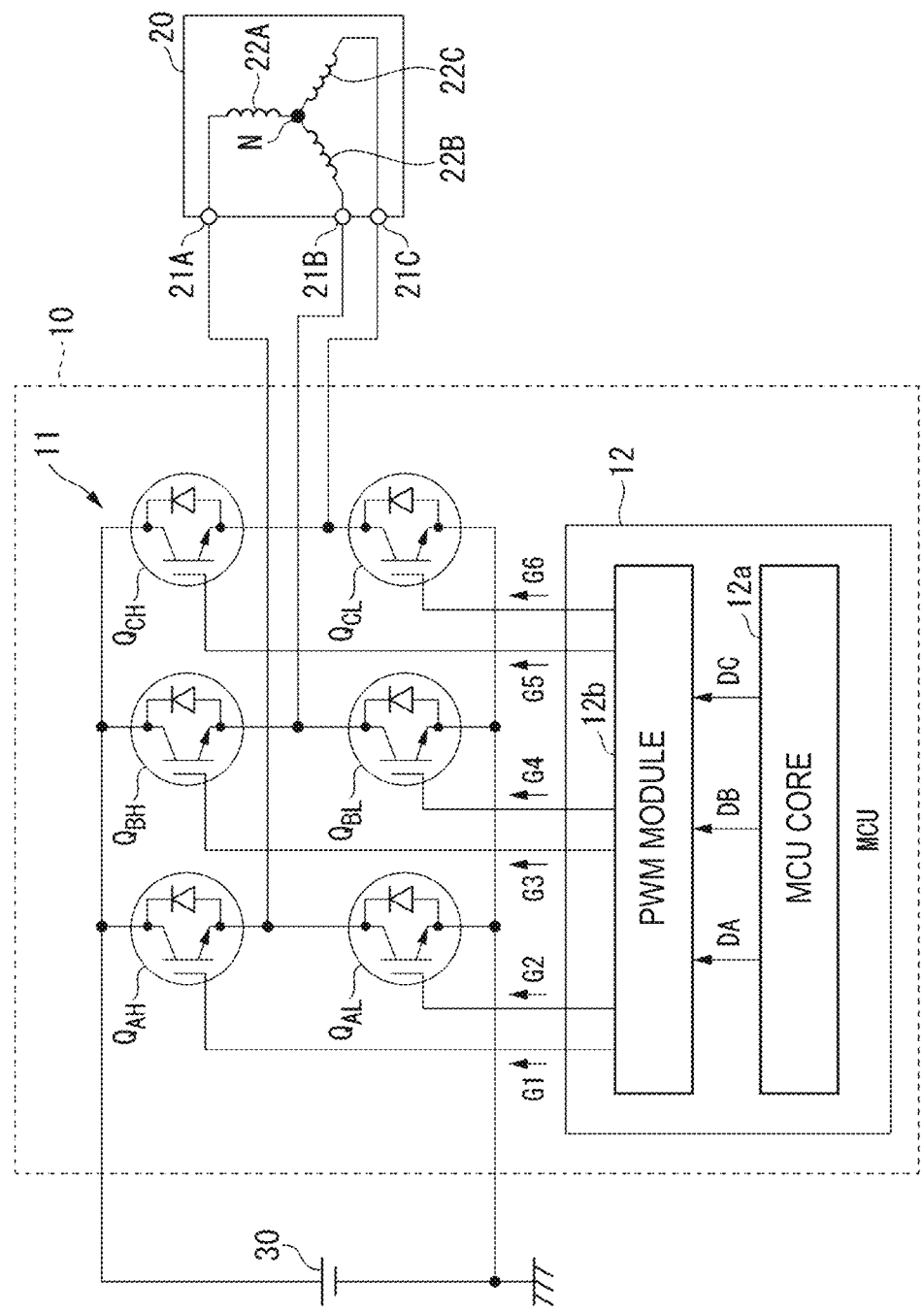

[Fig. 2]
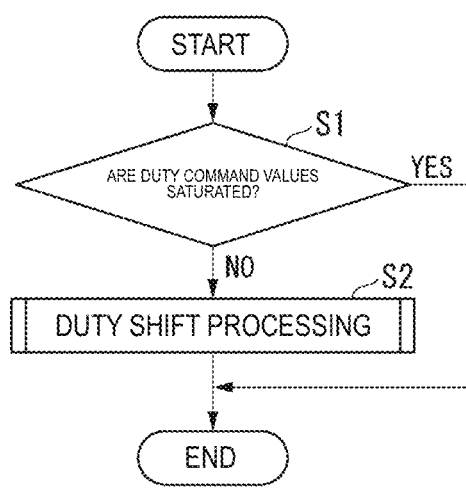

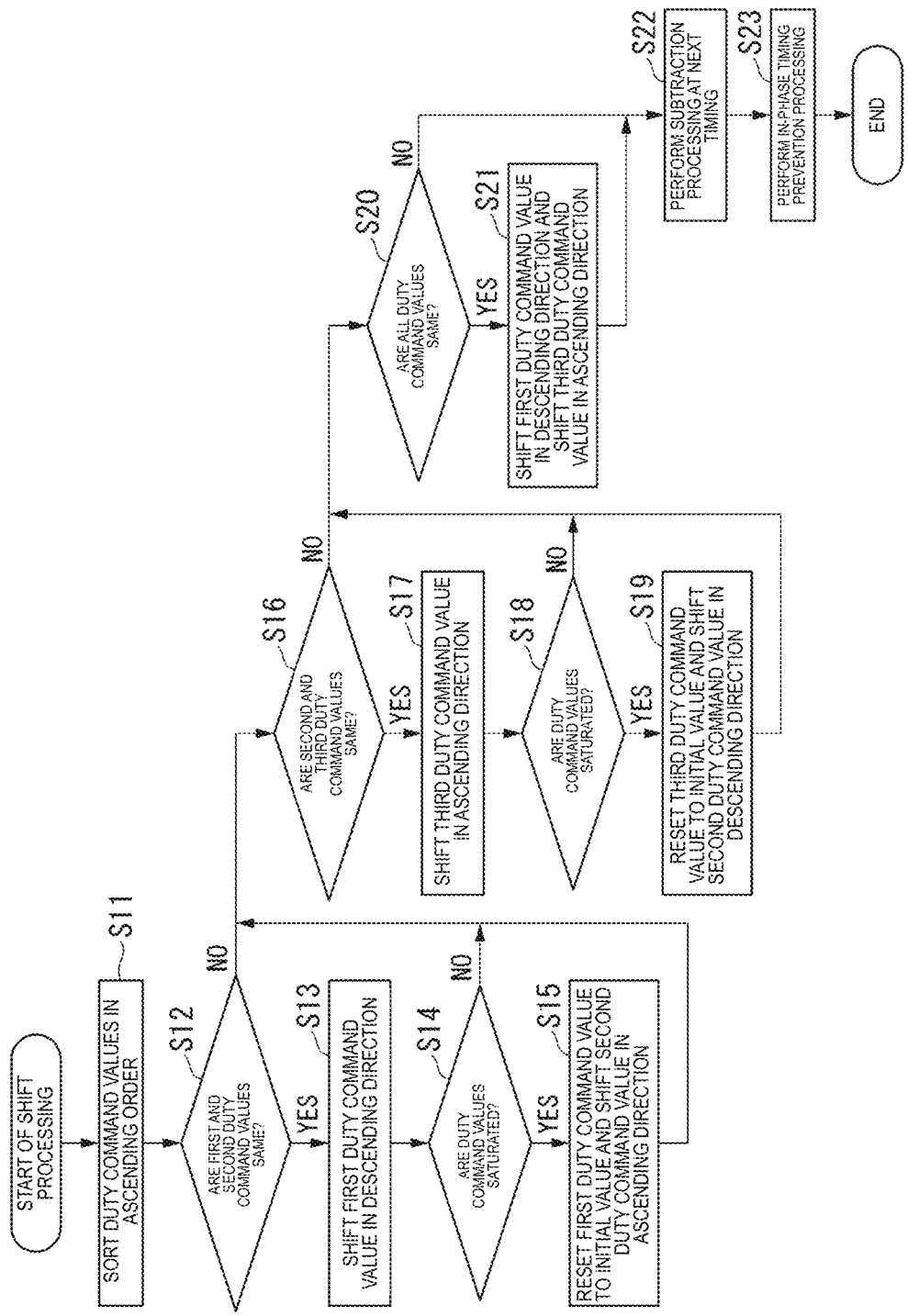
[Fig. 3]

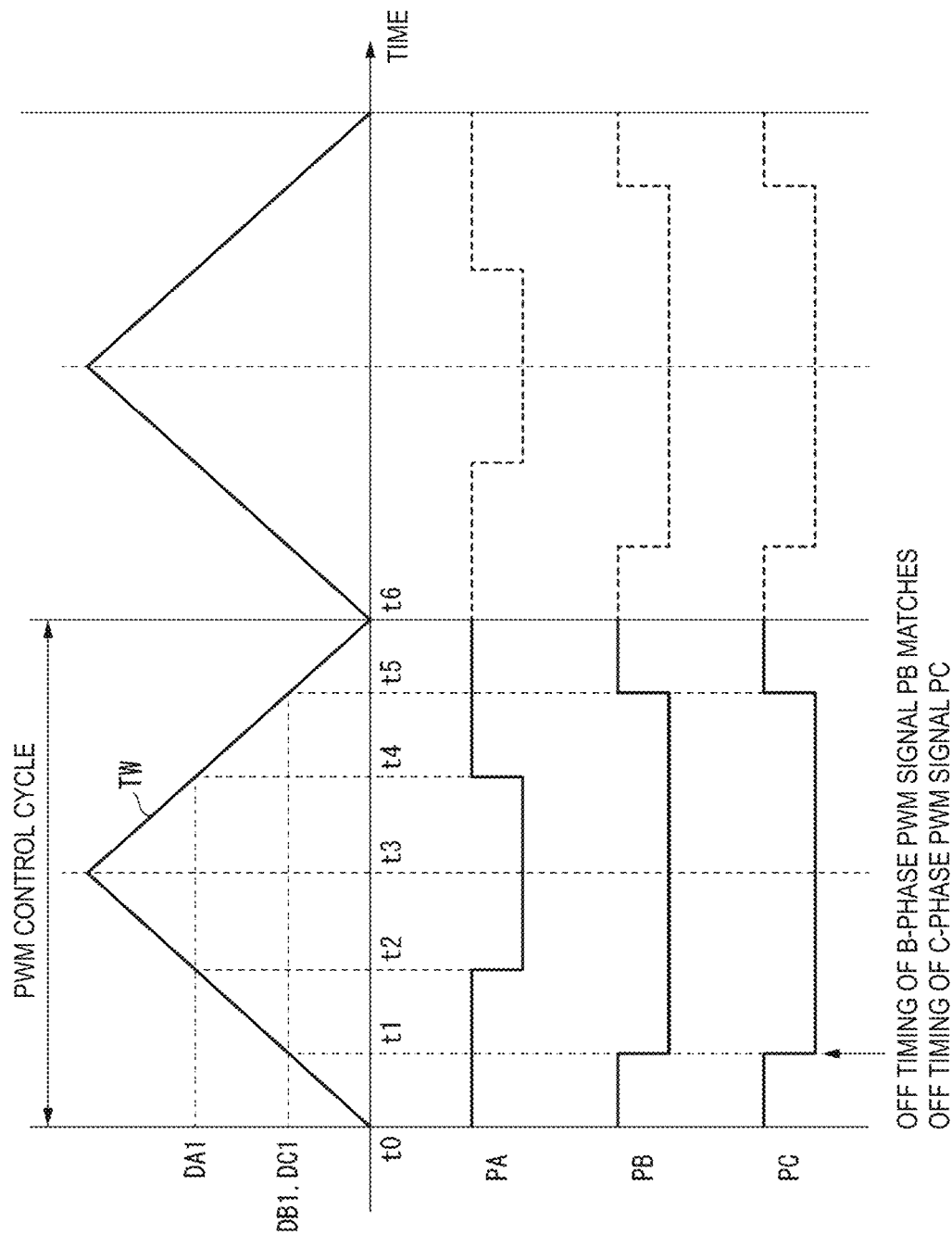
[Fig. 4]

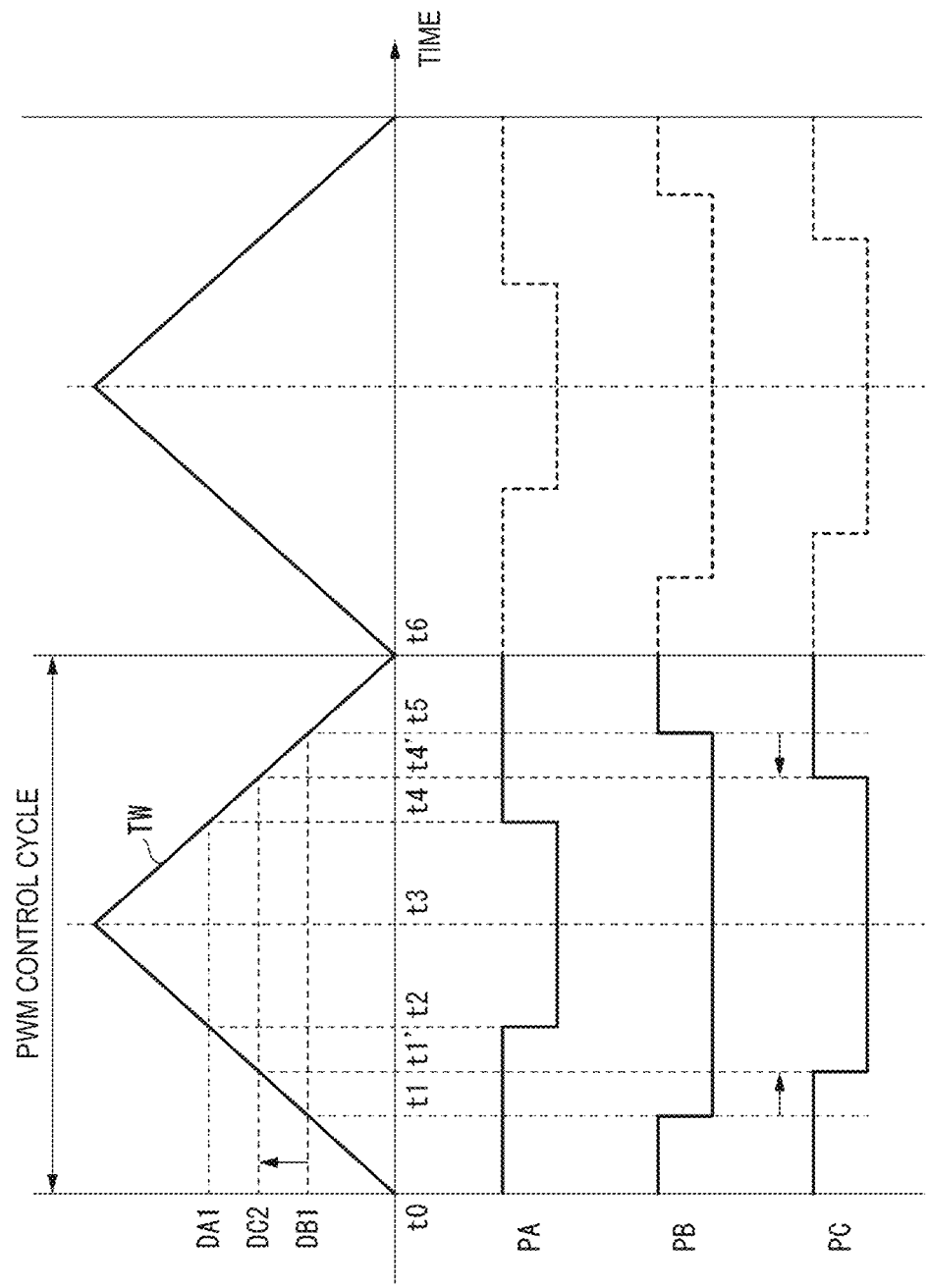
[Fig. 5]

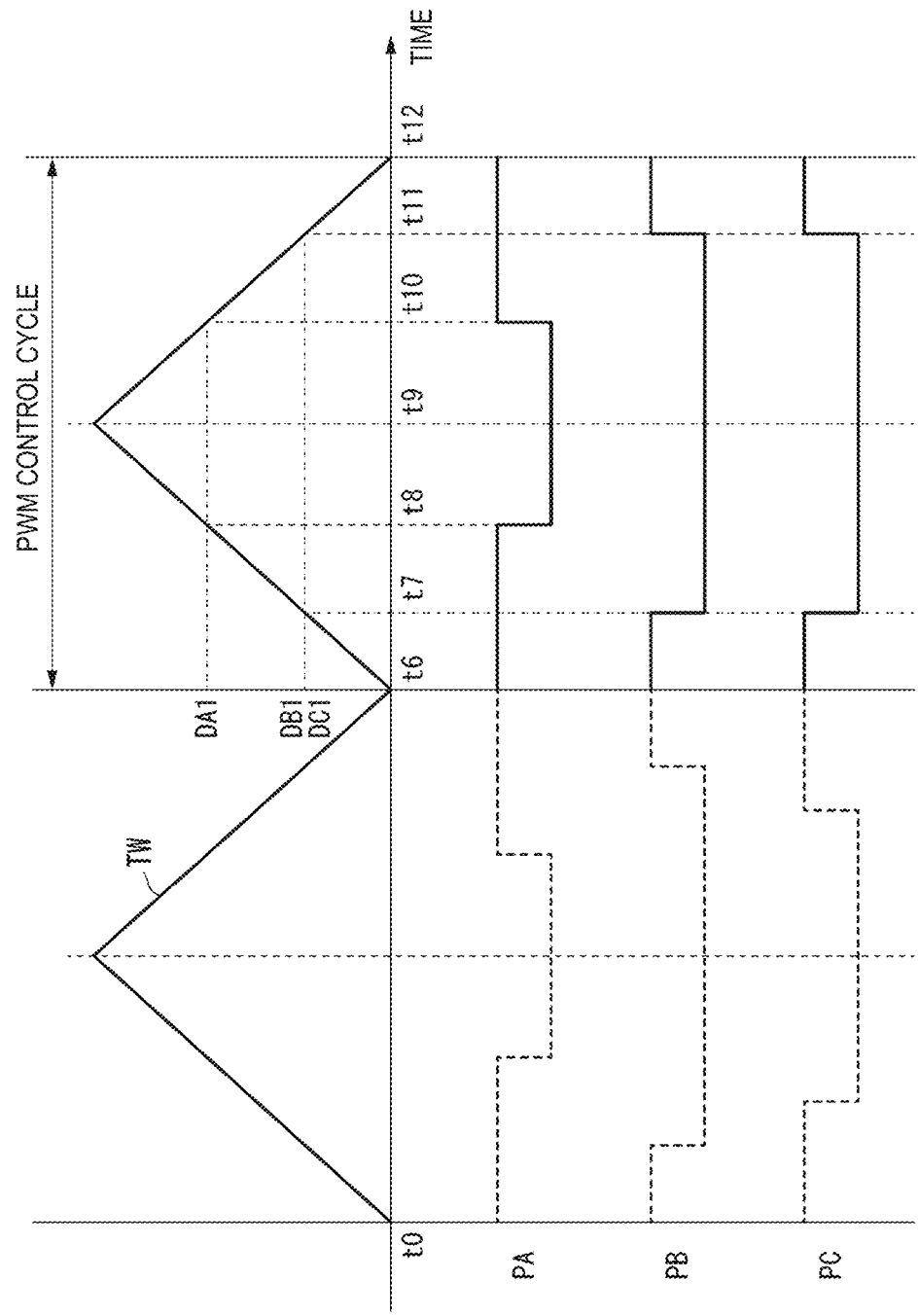
[Fig. 6]

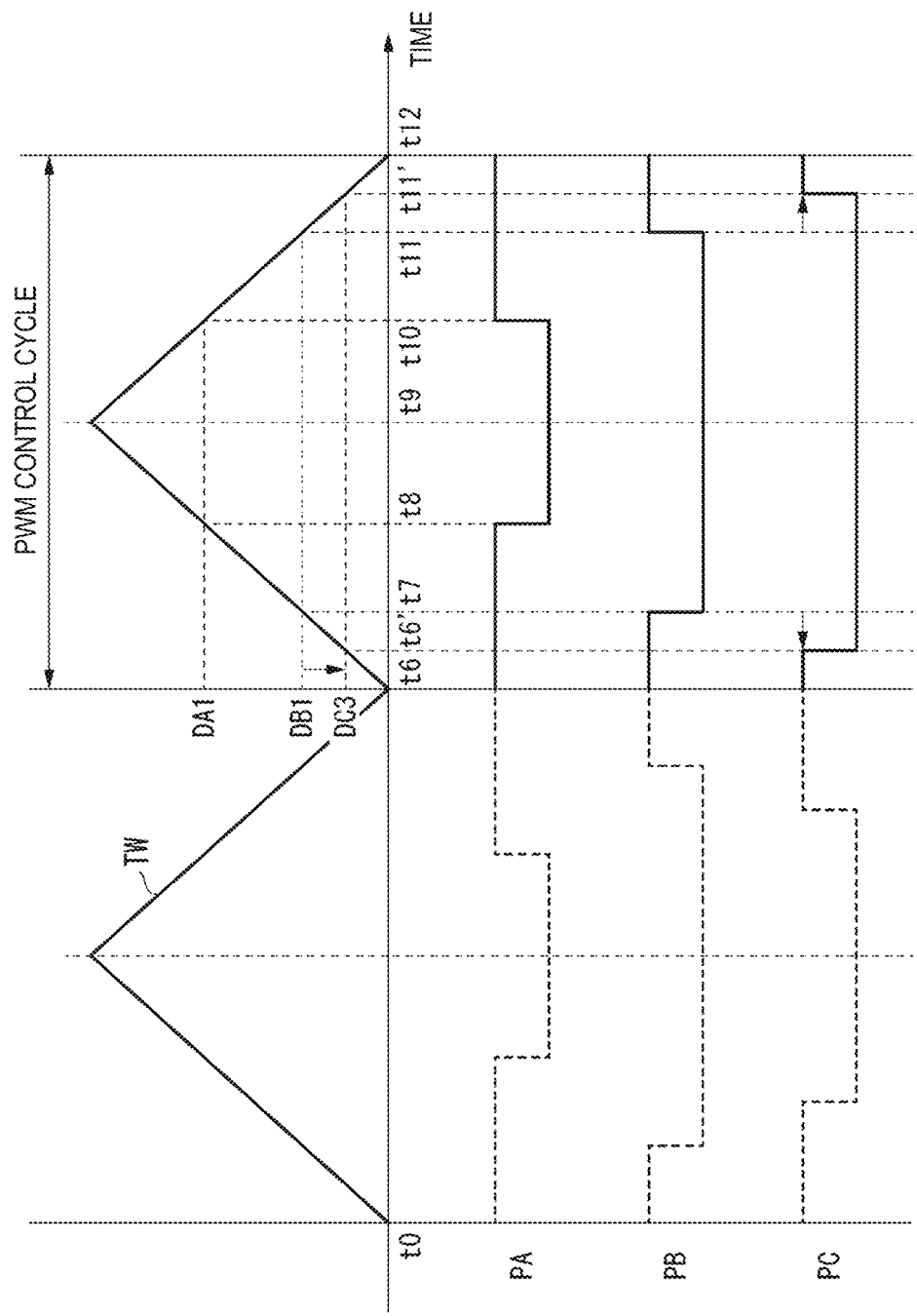
[Fig. 7]

MOTOR CONTROL DEVICE

CROSS-REFERENCE TO RELATED APPLICATIONS

The present application claims priority under 35 U.S.C. § 119 to Japanese Patent Application No. 2021-106096, filed on Jun. 25, 2021, the entire contents of which are hereby incorporated herein by reference.

1. FIELD OF THE INVENTION

The present disclosure relates to a motor control device.

2. BACKGROUND

There is a technique of generating three-phase pulse width modulation (PWM) signals using three types of basic voltage vectors in an inverter device that supplies a three-phase AC voltage to a three-phase motor and generating a switching signal to be supplied to each of at least six switching elements included in the inverter device on the basis of the three-phase PWM signals.

For example, the shaft voltage may fluctuate in a spike state at the moment when the switching timings of PWM signals of two phases of three-phase PWM signals coincide with each other. This may cause noise.

In another respect, electrolytic corrosion may occur in the rotor bearing due to the potential difference (shaft voltage) between the output shaft of the motor and the motor case. As a result of studies by the inventors of the present application, it has been discovered that particularly this noise may affect the occurrence of electrolytic corrosion.

SUMMARY

A motor control device according to an example embodiment of the present disclosure is a motor control device that controls a three-phase motor. The motor control device includes an inverter circuit to convert a DC power source voltage into a three-phase AC voltage and supply the three-phase AC voltage to the three-phase motor and a controller to generate three-phase PWM signals based on three-phase duty command values updated at a predetermined updating cycle and control the inverter circuit based on the three-phase PWM signals. The controller is configured or programmed to shift, when duty command values of at least two phases of the three-phase duty command values updated at a first update timing are the same, the duty command value of one phase of the duty command values of the two phases by a predetermined shift amount and shifts a duty command value of the one phase of the three-phase duty command values updated at a second update timing which is an update timing next to the first update timing by the shift amount in a direction opposite to a shift direction at the first update timing.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a circuit block diagram schematically illustrating the configuration of a motor control device according to an example embodiment of the present disclosure.

FIG. 2 is a flowchart illustrating each process included in the main routine of spike voltage suppression processing executed by an MCU core according to an example embodiment of the present disclosure.

FIG. 3 is a flowchart illustrating each process included in duty shift processing which is a subroutine of spike voltage suppression processing according to an example embodiment of the present disclosure.

FIG. 4 is a diagram schematically illustrating the principle of generating three-phase PWM signals based on three-phase duty command values according to an example embodiment of the present disclosure.

FIG. 5 is a first explanatory diagram used to describe duty shift processing according to an example embodiment of the present disclosure.

FIG. 6 is a second explanatory diagram used to describe duty shift processing according to an example embodiment of the present disclosure.

FIG. 7 is a third explanatory diagram used to describe duty shift processing according to an example embodiment of the present disclosure.

DETAILED DESCRIPTION

Example embodiments of the present disclosure will be described in detail below with reference to the accompanying drawings.

FIG. 1 is a circuit block diagram schematically illustrating the configuration of a motor control device 10 according to an example embodiment. As illustrated in FIG. 1, the motor control device 10 controls a three-phase motor 20. For example, the three-phase motor 20 is an inner rotor type three-phase brushless DC motor. The three-phase motor 20 is, for example, a driving motor (traction motor) mounted on a hybrid vehicle.

The three-phase motor 20 includes an A-phase terminal 21A, a B-phase terminal 21B, a C-phase terminal 21C, an A-phase coil 22A, a B-phase coil 22B, and a C-phase coil 22C. Although not illustrated in FIG. 1, the three-phase motor 20 includes a motor case, and a rotor and a stator housed in the motor case. The rotor is a rotating body rotatably supported by a bearing component such as a rotor bearing inside the motor case. The rotor has an output shaft coaxially joined to the rotor in a state of axially penetrating the radially inner side of the rotor. The stator is fixed inside the motor case in a state of surrounding an outer peripheral surface of the rotor, and generates an electromagnetic force necessary for rotating the rotor.

The A-phase terminal 21A, the B-phase terminal 21B, and the C-phase terminal 21C each are a metal terminal exposed from the surface of the motor case. Although details will be described later, the A-phase terminal 21A, the B-phase terminal 21B, and the C-phase terminal 21C each are electrically connected to an inverter circuit 11 of the motor control device 10. The A-phase coil 22A, the B-phase coil 22B, and the C-phase coil 22C are excitation coils provided on the stator. For example, the A-phase coil 22A, the B-phase coil 22B, and the C-phase coil 22C are star-connected inside the three-phase motor 20.

The A-phase coil 22A is electrically connected between the A-phase terminal 21A and a neutral point N. The B-phase coil 22B is electrically connected between the B-phase terminal 21B and the neutral point N. The C-phase coil 22C is electrically connected between the C-phase terminal 21C and the neutral point N. When the energization states of the A-phase coil 22A, the B-phase coil 22B, and the C-phase coil 22C are controlled by the motor control device 10, an electromagnetic force necessary for rotating the rotor is generated. When the rotor rotates, the output shaft also rotates in synchronization with the rotor.

The motor control device 10 includes the inverter circuit 11 and a microcontroller unit (MCU) 12. The inverter circuit 11 is a three-phase full bridge circuit that converts a DC power source voltage into a three-phase AC voltage and supplies the three-phase AC voltage to the three-phase motor 20. The inverter circuit 11 converts a DC power source voltage supplied from a DC power source 30 into a three-phase AC voltage and outputs the three-phase AC voltage to the three-phase motor 20. As an example, the DC power source 30 is one of a plurality of batteries mounted on a hybrid vehicle.

The inverter circuit 11 includes an A-phase upper arm switch QAH, a B-phase upper arm switch QBH, a C-phase upper arm switch QCH, an A-phase lower arm switch QAL, a B-phase lower arm switch QBL, and a C-phase lower arm switch QCL. In the present example embodiment, each arm switch is, for example, an insulated gate bipolar transistor (IGBT).

The collector terminal of the A-phase upper arm switch QAH, the collector terminal of the B-phase upper arm switch QBH, and the collector terminal of the C-phase upper arm switch QCH each are electrically connected to the positive electrode terminal of the DC power source 30. The emitter terminal of the A-phase lower arm switch QAL, the emitter terminal of the B-phase lower arm switch QBL, and the emitter terminal of the C-phase lower arm switch QCL each are electrically connected to the negative electrode terminal of the DC power source 30. The negative electrode terminal of the DC power source 30 is electrically connected to the in-vehicle ground.

The emitter terminal of the A-phase upper arm switch QAH is electrically connected to each of the A-phase terminal 21A of the three-phase motor 20 and the collector terminal of the A-phase lower arm switch QAL. The emitter terminal of the B-phase upper arm switch QBH is electrically connected to each of the B-phase terminal 21B of the three-phase motor 20 and the collector terminal of the B-phase lower arm switch QBL. The emitter terminal of the C-phase upper arm switch QCH is electrically connected to each of the C-phase terminal 21C of the three-phase motor 20 and the collector terminal of the C-phase lower arm switch QCL.

The gate terminal of the A-phase upper arm switch QAH, the gate terminal of the B-phase upper arm switch QBH, and the gate terminal of the C-phase upper arm switch QCH each are electrically connected to an MCU 12. The gate terminal of the A-phase lower arm switch QAL, the gate terminal of the B-phase lower arm switch QBL, and the gate terminal of the C-phase lower arm switch QCL each are also electrically connected to the MCU 12.

As described above, the inverter circuit 11 is configured of a three-phase full-bridge circuit having three upper arm switches and three lower arm switches. The inverter circuit configured as described above converts the DC power source voltage supplied from the DC power source 30 into a three-phase AC voltage, with switching control of the respective arm switches by the MCU 12, and outputs the three-phase AC voltage to the three-phase motor 20.

The MCU 12 is a controller that generates three-phase PWM signals on the basis of three-phase duty command values updated at a predetermined updating cycle and controls the inverter circuit 11 on the basis of the generated three-phase PWM signals. The three-phase duty command value includes an A-phase duty command value DA, a B-phase duty command value DB, and a C-phase duty command value DC. The three-phase PWM signals include an A-phase PWM signal PA, a B-phase PWM signal PB, and a C-phase PWM signal PC. The MCU 12 includes an MCU core 12a and a PWM module 12b.

The MCU core 12a executes duty calculation processing of calculating at least a three-phase duty command value according to a program stored in advance in a memory (not illustrated). Although not illustrated in FIG. 1, a torque command value output from the host control device is input to the MCU 12. For example, the host control device is an electronic controller (ECU) mounted on a hybrid vehicle. The MCU core 12a calculates a q-axis current command value and a d-axis current command value based on the torque command value and calculates a three-phase duty command value as a three-phase voltage command value based on these current command values. The MCU core 12a outputs the three-phase duty command values, namely, the A-phase duty command value DA, the B-phase duty command value DB, and the C-phase duty command value DC, to the PWM module 12b.

The PWM module 12b generates three-phase PWM signals based on three-phase duty command values updated at a predetermined updating cycle. FIG. 4 is a diagram schematically illustrating the principle of generating three-phase PWM signals based on three-phase duty command values. As illustrated in FIG. 4, the PWM module 12b generates a triangular wave TW having a predetermined period. Hereinafter, the period of the triangular wave TW may be referred to as a PWM control cycle.

More specifically, the triangular wave TW is formed from the count value of a PWM timer. The PWM timer starts counting up from start time t0 of the nth PWM control cycle. At time t3 corresponding to ½ of the PWM control cycle, the PWM timer finishes counting up and starts counting down. The PWM timer finishes counting down at end time t6 of the nth PWM control cycle. Time t6 is also the start time of the next PWM control cycle, that is, the (n+1)th PWM control cycle. Therefore, the PWM timer starts counting up from start time t6 of the (n+1)th PWM control cycle.

The three-phase duty command value is updated at start time t0 of the nth PWM control cycle and start time t6 of the (n+1)th PWM control cycle. That is, the updating cycle of the three-phase duty command value coincides with the PWM control cycle. In the PWM module 12b, a buffer register and an update register are allocated to each of the three duty command values included in the three-phase duty command value. The three-phase duty command value calculated by the MCU core 12a is first stored in the buffer register. When the update timings such as time t0 and time t6 arrive, the three-phase duty command value stored in the buffer register is transferred to the update register. As described above, "the three-phase duty command value is updated" means that the three-phase duty command value is transferred from the buffer register to the update register at the update timing.

This means that the MCU core 12a needs to calculate a three-phase duty command value at a timing earlier than the update timing. That is, the MCU core 12a calculates a three-phase duty command value used in the nth PWM control cycle at a timing earlier than start time t0 (nth update timing) of the nth PWM control cycle and outputs the calculated value to the PWM module 12b. In addition, the MCU core 12a calculates a three-phase duty command value used in the (n+1)th PWM control period at a timing (for example, time t3) earlier than start time t6 ((n+1)th update timing) of the (n+1)th PWM control cycle and outputs the calculated value to the PWM module 12b.

As illustrated in FIG. 4, it is assumed that the A-phase duty command value DA is updated to "DA1", the B-phase duty command value DB is updated to "DB1", and the C-phase duty command value DC is updated to "DC1" at start time t0 (nth update timing) of the nth PWM control cycle. The B-phase duty command value DB1 and the C-phase duty command value DC1 have the same value. The A-phase duty command value DA1 is a value higher than the B-phase duty command value DB1 and the C-phase duty command value DC1. "DA1", "DB1", and "DC1" are values in the update register allocated to each duty command value as described above.

When the triangular wave TW reaches the three-phase duty command value while the triangular wave TW rises, the level of the three-phase PWM signal is set to the low level. On the other hand, when the triangular wave TW reaches the three-phase duty command value while the triangular wave TW is descending, the level of the three-phase PWM signal is set to the high level. In other words, when the count value of the PWM timer matches the three-phase duty command value while the PWM timer counts up, the level of the three-phase PWM signal is set to the low level. On the other hand, when the count value of the PWM timer matches the three-phase duty command value while the PWM timer counts down, the level of the three-phase PWM signal is set to the high level.

In the example illustrated in FIG. 4, while the PWM timer counts up, the count value of the PWM timer coincides with the B-phase duty command value DB1 and the C-phase duty command value DC1 at time t1 and coincides with the A-phase duty command value DA1 at time t2. On the other hand, while the PWM timer counts down, the count value of the PWM timer coincides with the A-phase duty command value DA1 at time t4 and coincides with the B-phase duty command value DB1 and the C-phase duty command value DC1 at time t5.

Accordingly, in the example illustrated in FIG. 4, in the nth PWM control cycle, the levels of the B-phase PWM signal PB and the C-phase PWM signal PC are set to the low level at time t1, and the level of the A-phase PWM signal PA is set to the low level at time t2. In addition, in the nth PWM control cycle, the level of the A-phase PWM signal PA is set to the high level at time t4, and the levels of the B-phase PWM signal PB and the C-phase PWM signal PC are set to the high level at time t5.

Referring to FIG. 4, the three-phase PWM signal after start time t6 ((n+1)th update timing) of the (n+1)th PWM control cycle is indicated by the dotted line. This is because it is not determined to what value the three-phase duty command value is updated at the (n+1)th update timing at the time of the nth update timing. Referring to FIG. 4, the dotted line of the three-phase PWM signal at the (n+1)th update timing is drawn assuming that the three-phase duty command value is updated to the same value as the value updated at the nth update timing.

As described above, the duty ratio of the three-phase PWM signal generated by the PWM module 12b is controlled by the three-phase duty command value updated at a predetermined updating cycle. The PWM module 12b generates a gate control signal to be supplied to the gate terminal of each arm switch included in the inverter circuit 11 on the basis of the three-phase PWM signals generated as described above.

The gate control signal includes an A-phase upper gate control signal G1 supplied to the gate terminal of the A-phase upper arm switch QAH and an A-phase lower gate control signal G2 supplied to the gate terminal of the A-phase lower arm switch QAL. The gate control signal includes a B-phase upper gate control signal G3 supplied to the gate terminal of the B-phase upper arm switch QBH and a B-phase lower gate control signal G4 supplied to the gate terminal of the B-phase lower arm switch QBL. In addition, the gate control signal includes a C-phase upper gate control signal G5 supplied to the gate terminal of the C-phase upper arm switch QCH and a C-phase lower gate control signal G6 supplied to the gate terminal of the C-phase lower arm switch QCL.

Note that a dead time is inserted into each gate control signal in order to prevent the upper arm switch and the lower arm switch of the same phase from being simultaneously switched on.

As described above, due to the potential difference (shaft voltage) between the output shaft of the three-phase motor 20 and the motor case, electrolytic corrosion may occur in the rotor bearing of the three-phase motor 20. In the example illustrated in FIG. 4, the OFF timing of the B-phase PWM signal PB coincides with the OFF timing of the C-phase PWM signal PC in the nth PWM control cycle. As a result of the study by the inventors of the present application, it has been found that, as illustrated in FIG. 4, the occurrence of electrolytic corrosion may be influenced by spike-like fluctuation of the shaft voltage at the moment when the switching timings of PWM signals of two phases of the three-phase PWM signals coincide with each other.

In the example illustrated in FIG. 4, for example, when the three-phase motor 20 is in the regenerative state (power generation state) and B-phase and C-phase currents are positive (when the current flows from the inverter circuit 11 to the three-phase motor 20), if the switching timings of the B-phase PWM signal PB and the C-phase PWM signal PC overlap with each other, a rapid fluctuation in shaft voltage occurs. On the other hand, in a similar state, when the B-phase current is positive and the C-phase current is negative, if the turn-off of the B-phase high side and the turn-on of the C-phase low side overlap each other, or if the turn-on of the B-phase high side and the turn-off of the C-phase low side overlap each other, a rapid fluctuation in shaft voltage occurs.

In order to solve the above technical problem, when at least duty command values of two phases of the three-phase duty command values updated at the first update timing are the same, the MCU core 12a of the MCU 12 according to the present example embodiment executes spike voltage suppression processing including a process of shifting a duty command value of one phase of the duty command values of two phases by a predetermined shift amount and a process of shifting a duty command value of one phase of the three-phase duty command values updated at the second update timing that is the timing next to the first update timing by a predetermined shift amount in a direction opposite to the shift direction at the first update timing. The spike voltage suppression processing executed by the MCU core 12a will be described in detail below.

FIG. 2 is a flowchart illustrating each process included in the main routine of spike voltage suppression processing executed by the MCU core 12a. FIG. 3 is a flowchart illustrating each process included in duty shift processing which is a subroutine of spike voltage suppression processing. After calculating the three-phase duty command value at a timing earlier than the update timing, the MCU core 12a executes the spike voltage suppression processing before outputting the three-phase duty command value to the PWM module 12b.

For example, the MCU core 12a executes the spike voltage suppression processing after calculating the three-phase duty command value used in the nth PWM control cycle at a timing earlier than start time t0 (nth update timing) of the nth PWM control cycle illustrated in FIG. 4. The nth update timing corresponds to the first update timing.

As illustrated in FIG. 2, when starting the spike voltage suppression processing, the MCU core 12a first determines whether the calculated three-phase duty command value, that is, the three-phase duty command value updated at the nth update timing is saturated (step S1). More specifically, the MCU core 12a determines that the three-phase duty command value is in a saturated state when at least one of the following first and second saturation conditions is satisfied.

(First Saturation Condition) The largest value of the three-phase duty command values is "+1" or more.

(Second Saturation Condition) The smallest value of the three-phase duty command values is "−1" or less.

Note that "+1" is a value corresponding to a duty ratio of 100%, and "−1" is a value corresponding to a duty ratio of 0%.

When the first saturation condition is satisfied, the MCU core 12a does not execute the duty shift processing for the largest three-phase duty command value. However, even if the largest value is "+1" or more, if the remaining two small values overlap each other, for example, at a value of "−0.9", the MCU core 12a executes the duty shift processing.

On the other hand, when the second saturation condition is satisfied, the MCU core 12a does not execute the duty shift processing for the smallest three-phase duty command value. However, even if the smallest value is "−1" or less, if the remaining two large values overlap each other by, for example, at a value of "+0.9", the MCU core 12a executes the duty shift processing.

If "Yes" in step S1, that is, if the three-phase duty command value updated at the nth update timing is in a saturated state, the MCU core 12a ends the spike voltage suppression processing without shifting to the duty shift processing which is a subroutine. On the other hand, if "No" in step S1, that is, if the three-phase duty command value updated at the nth update timing is not in a saturated state, the MCU core 12a proceeds to the duty shift processing which is a subroutine (step S2).

In the example illustrated in FIG. 4, the A-phase duty command value DA1, the B-phase duty command value DB1, and the C-phase duty command value DC1 are calculated as the three-phase duty command values updated at the nth update timing (time t0). The B-phase duty command value DB1 and the C-phase duty command value DC1 have the same value. The A-phase duty command value DA1 is a value higher than the B-phase duty command value DB1 and the C-phase duty command value DC1. In this case, since both the first and second saturation conditions are not satisfied, the MCU core 12a proceeds to the duty shift processing illustrated in FIG. 3.

As illustrated in FIG. 3, when starting the duty shift processing, the MCU core 12a first rearranges the three-phase duty command values updated at the nth update timing (time t0) in ascending order (step S11). In the example illustrated in FIG. 4, since the A-phase duty command value DA1 is a value higher than the B-phase duty command value DB1 and the C-phase duty command value DC1, the command values DA1 (first), DB1 (second), and DC1 (third) are rearranged in the order named. The basic order of the three-phase duty command value is set to the order of the A-phase duty command value DA (first), the B-phase duty command value DB (second), and the C-phase duty command value DC (third). When at least two or more of the three-phase duty command values have the same value, the MCU core 12a rearranges the three-phase duty command values according to the basic order.

Subsequently, the MCU core 12a determines whether or not, of the three-phase duty command values rearranged in ascending order, the first duty command value and the second duty command value are the same value (step S12). In the example illustrated in FIG. 4, in step S12, the MCU core 12a determines whether or not the first A-phase duty command value DA1 and the second B-phase duty command value DB1 are the same.

If "Yes" in step S12, that is, if the first duty command value and the second duty command value are the same, the MCU core 12a shifts the first duty command value by a predetermined shift amount in a descending direction (step S13). The predetermined shift amount is determined in advance by experiment, simulation, or the like and is stored in advance in a memory or the like in the MCU 12. That is, in step S13, the MCU core 12a reads the shift amount from the memory and shifts the first duty command value by the shift amount in the descending direction.

In contrast, if "No" in step S12, that is, if the first duty command value is different from the second duty command value, the MCU core 12a determines whether or not the second and third duty command values of the three-phase duty command values rearranged in ascending order are the same value (step S16). In the example illustrated in FIG. 4, since the first A-phase duty command value DA1 and the second B-phase duty command value DB1 are different, the MCU core 12a proceeds from step S12 to the process of step S16.

If "Yes" in step S16, that is, if the second duty command value and the third duty command value are the same, the MCU core 12a shifts the third duty command value by a predetermined shift amount in the ascending direction (step S17). In the example illustrated in FIG. 4, since the second B-phase duty command value DB1 and the third C-phase duty command value DC1 are the same, the MCU core 12a proceeds from step S16 to step S17 and shifts the third C-phase duty command value DC1 by a predetermined shift amount in the ascending direction. Hereinafter, the C-phase duty command value DC after the shift is referred to as "DC2". That is, by shifting the third C-phase duty command value DC1 by a predetermined shift amount in the ascending direction, the C-phase duty command value DC is adjusted to DC2 which is a value higher than DC1 by the shift amount.

Subsequently, the MCU core 12a determines whether or not the third duty command value after the shift is saturated (step S18). When the third duty command value after the shift is "+1" or more, the MCU core 12a determines that the third duty command value after the shift is saturated.

If "No" in step S18, that is, if the third duty command value after the shift is not saturated, the MCU core 12a determines whether all the three-phase duty command values are the same (step S20). In the above example, since the third C-phase duty command value DC2 after the shift has not reached "+1", the MCU core 12a proceeds from step S18 to step S20 and determines whether or not all the three-phase duty command values are the same.

If "No" in step S20, that is, if not all the three-phase duty command values are the same, the MCU core 12a outputs all the three-phase duty command values to the PWM module 12b and then performs subtraction processing at the next update timing (second update timing) (step S22). In the above example, the MCU core 12a holds the A-phase duty command value DA1, the B-phase duty command value DB1, and the C-phase duty command value DC2 as the three-phase duty command values at the time of step S20. In this case, since not all the three-phase duty command values are the same, the MCU core 12a outputs the A-phase duty command value DA1, the B-phase duty command value DB1, and the C-phase duty command value DC2 to the PWM module 12b.

In this case, as illustrated in FIG. 5, in the PWM module 12b, the A-phase duty command value DA is updated to "DA1", the B-phase duty command value DB is updated to "DB1", and the C-phase duty command value DC is updated to "DC2" at the nth update timing (time t0). As can be seen by comparing FIGS. 4 and 5, the above-described duty shift processing is executed by the MCU core 12a to update the C-phase duty command value DC to "DC2", which is a value higher than the initially calculated "DC1" by the shift amount at the nth update timing (time t0).

In the example illustrated in FIG. 5, in the nth PWM control cycle, while the PWM timer counts up, the count value of the PWM timer coincides with the B-phase duty command value DB1 at time t1, coincides with the C-phase duty command value DC2 at time t1', and coincides with the A-phase duty command value DA1 at time t2. Time t1' is a time between time t1 and time t2. In contrast, while the PWM timer counts down, the count value of the PWM timer coincides with the A-phase duty command value DA1 at time t4, coincides with the C-phase duty command value DC2 at time t4', and coincides with the B-phase duty command value DB1 at time t5. Time t4' is a time between time t4 and time t5.

Therefore, in the example illustrated in FIG. 5, in the nth PWM control cycle, the level of the B-phase PWM signal PB is set to the low level at time t1, the level of the C-phase PWM signal PC is set to the low level at time t1', and the level of the A-phase PWM signal PA is set to the low level at time t2. In addition, in the nth PWM control cycle, the level of the A-phase PWM signal PA is set to the high level at time t4, the level of the C-phase PWM signal PC is set to the high level at time t4', and the level of the B-phase PWM signal PB is set to the high level at time t5.

As can be seen by comparing FIGS. 4 and 5, the above-described duty shift process is executed by the MCU core 12a to prevent the OFF timing of the B-phase PWM signal PB and the OFF timing of the C-phase PWM signal PC from matching in the above nth PWM control cycle. As described above, when at least the duty command values of two phases of the three-phase duty command values updated at the nth update timing are the same, the duty command value of one phase of the duty command values of two phases is shifted by a predetermined shift amount, thereby suppressing the shaft voltage from varying in a spike state.

However, when the above-described duty shift processing is executed by the MCU core 12a, the duty ratio of the C-phase PWM signal PC generated in the nth PWM control cycle becomes a value increased by a predetermined shift amount from the originally required duty ratio, that is, the duty ratio corresponding to the C-phase duty command value DC1 calculated first. In this state, the drive current supplied from the inverter circuit 11 to the three-phase motor 20 cannot be controlled to the current originally required.

Accordingly, in the present example embodiment, the MCU core 12a executes subtraction processing of shifting the duty command value of one phase of the three-phase duty command values updated at the second update timing which is the update timing next to the first update timing by a predetermined shift amount in a direction opposite to the shift direction at the first update timing.

As illustrated in FIG. 6, the MCU core 12a calculates the three-phase duty command value used in the (n+1)th PWM control cycle at a timing earlier than start time t6 ((n+1)th update timing) of the (n+1)th PWM control cycle. The (n+1)th update timing corresponds to the second update timing.

In the example illustrated in FIG. 6, it is assumed that the A-phase duty command value DA1, the B-phase duty command value DB1, and the C-phase duty command value DC1 are calculated as the three-phase duty command value updated at the (n+1)th update timing (time t6). The B-phase duty command value DB1 and the C-phase duty command value DC1 have the same value. The A-phase duty command value DA1 is a value higher than the B-phase duty command value DB1 and the C-phase duty command value DC1.

When the three-phase duty command value used in the (n+1)th PWM control cycle is calculated, the three-phase duty command value has not yet been updated at the (n+1)th update timing. Therefore, originally, the three-phase PWM signals after the (n+1)th update timing should be in an undetermined state. However, in order to facilitate understanding of the subtraction processing, in FIG. 6, the waveforms of the three-phase PWM signals are drawn assuming that the three-phase duty command values are updated to DA1, DB1, and DC1 at the (n+1)th update timing (time t6).

In the example illustrated in FIG. 6, in the (n+1)th PWM control cycle, while the PWM timer counts up, the count value of the PWM timer coincides with the B-phase duty command value DB1 and the C-phase duty command value DC1 at time t7, coincides with the B-phase duty command value DB1 at time t8, and coincides with the A-phase duty command value DA1 at time t8. On the other hand, while the PWM timer counts down, the count value of the PWM timer coincides with the A-phase duty command value DA1 at time t10 and coincides with the B-phase duty command value DB1 and the C-phase duty command value DC1 at time t11.

Accordingly, in the example illustrated in FIG. 6, in the (n+1)th PWM control cycle, the levels of the B-phase PWM signal PB and the C-phase PWM signal PC are set to the low level at time t7, and the level of the A-phase PWM signal PA is set to the low level at time t8. In addition, in the (n+1)th PWM control cycle, the level of the A-phase PWM signal PA is set to the high level at time t10, and the levels of the B-phase PWM signal PB and the C-phase PWM signal PC are set to the high level at time t11.

In the example illustrated in FIG. 6, the MCU core 12a shifts the C-phase duty command value DC1 calculated before the (n+1)th update timing in a direction opposite to the shift direction at the nth update timing (t0) by a predetermined shift amount. That is, the MCU core 12a shifts the C-phase duty command value DC1 by a predetermined shift amount in the descending direction. The C-phase duty command value DC after the shift will be referred to as "DC3" hereinafter. That is, by shifting the C-phase duty command value DC1 by a predetermined shift amount in the descending direction, the C-phase duty command value DC is adjusted to DC3 which is a value lower than DC1 by the predetermined shift amount.

In this case, as illustrated in FIG. 7, in the PWM module 12b, the A-phase duty command value DA is updated to "DA1", the B-phase duty command value DB is updated to "DB1", and the C-phase duty command value DC is updated to "DC3" at the (n+1)th update timing (time t6). As can be seen by comparing FIGS. 6 and 7, the above-described subtraction processing is executed by the MCU core 12a to update the C-phase duty command value DC to "DC3", which is a value lower than the initially calculated "DC1" by the shift amount at the (n+1)th update timing (time t6).

In the example illustrated in FIG. 7, in the (n+1)th PWM control cycle, while the PWM timer counts up, the count value of the PWM timer coincides with the C-phase duty command value DC3 at time t6', coincides with the B-phase duty command value DB1 at time t7, and coincides with the A-phase duty command value DA1 at time t8. Time t6' is a time between time t6 and time t7. In contrast, while the PWM timer counts down, the count value of the PWM timer coincides with the A-phase duty command value DA1 at time t10, coincides with the B-phase duty command value DB1 at time t11, and coincides with the C-phase duty command value DC3 at time t11'. Time t11' is a time between time t11 and time t12.

Therefore, in the example illustrated in FIG. 7, in the (n+1)th PWM control cycle, the level of the C-phase PWM signal PC is set to the low level at time t6', the level of the B-phase PWM signal PB is set to the low level at time t7, and the level of the A-phase PWM signal PA is set to the low level at time t8. In addition, in the (n+1)th PWM control cycle, the level of the A-phase PWM signal PA is set to the high level at time t10, the level of the B-phase PWM signal PB is set to the high level at time t11, and the level of the C-phase PWM signal PC is set to the high level at time t11'.

As can be seen by comparing FIGS. 6 and 7, when the above-described subtraction processing is executed by the MCU core 12a, the duty ratio of the C-phase PWM signal PC generated in the (n+1)th PWM control cycle becomes a value reduced by a predetermined shift amount from the originally required duty ratio, that is, the duty ratio corresponding to the C-phase duty command value DC1 calculated first. Therefore, when the control cycle including the nth PWM control cycle and the (n+1)th PWM control cycle is viewed in total by executing the subtraction processing described above, the duty ratio of the C-phase PWM signal PC is controlled to the originally necessary duty ratio. As a result, when the control cycle including the nth PWM control cycle and the (n+1)th PWM control cycle is viewed in total, the drive current supplied from the inverter circuit 11 to the three-phase motor 20 can be controlled to a current that is originally necessary.

As described above, the motor control device 10 according to the present example embodiment includes the MCU 12 that generates the three-phase PWM signals on the basis of the three-phase duty command values updated at a predetermined updating cycle, and controls the inverter circuit 11 on the basis of the generated three-phase PWM signal. When the duty command values of at least two phases of the three-phase duty command values updated at the first update timing are the same, the MCU 12 shifts the duty command value of one phase of the duty command values of two phases by a predetermined shift amount.

According to the present example embodiment as described above, since the switching timings of at least PWM signals of two phases of the three-phase PWM signals generated based on the three-phase duty command values updated at the first update timing are prevented from coinciding with each other, it is possible to suppress the shaft voltage of the three-phase motor 20 from fluctuating in a spike state. That is, according to the present example embodiment, it is possible to reduce noise caused by fluctuations in shaft voltage in a spike state. As a result, according to the present example embodiment, it is possible to suppress the occurrence of electrolytic corrosion in the rotor bearing of the three-phase motor 20.

In addition, in the present example embodiment, the MCU 12 shifts the duty command value of one phase of the three-phase duty command values updated at the second update timing which is the update timing next to the first update timing by a predetermined shift amount in a direction opposite to the shift direction at the first update timing.

As a result, when the PWM control cycle is viewed in total, the duty ratio of the three-phase PWM signal is controlled to the originally necessary duty ratio. As a result, when the PWM control cycle is viewed in total, the drive current supplied from the inverter circuit 11 to the three-phase motor 20 can be controlled to a current that is originally necessary.

The present disclosure is not limited to the above example embodiments, and the configurations described in the present description can be appropriately combined within a range not conflicting with one another.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor control device that controls a three-phase motor, the motor control device comprising:
an inverter circuit to convert a DC power source voltage into a three-phase AC voltage and supply the three-phase AC voltage to the three-phase motor; and
a controller to generate three-phase PWM signals based on three-phase duty command values updated at a predetermined updating cycle and control the inverter circuit based on the three-phase PWM signals; wherein
the controller is configured or programmed to:
shift, when duty command values of at least two phases of the three-phase duty command values updated at a first update timing are the same, the duty command value of one phase of the duty command values of the two phases by a predetermined shift amount; and
shift a duty command value of the one phase of the three-phase duty command values updated at a second update timing which is an update timing next to the first update timing by the shift amount in a direction opposite to a shift direction at the first update timing.

2. The motor control device according to claim 1, wherein the controller is configured or programmed to:
rearrange the three-phase duty command values updated at the first update timing in ascending order;
shift, when a first duty command value and a second duty command value of the three-phase duty command values rearranged in ascending order are the same, the first duty command value by the shift amount in a descending direction; and
shift the first duty command value of the three-phase duty command values updated at the second update timing by the shift amount in an ascending direction.

3. The motor control device according to claim 2, wherein the controller is configured or programmed to:

shift, when the second duty command value and a third duty command value of the three-phase duty command values rearranged in ascending order are the same, the third duty command value by the shift amount in the ascending direction; and shift the third duty command value of the three-phase duty command values updated at the second update timing by the shift amount in the descending direction.

4. The motor control device according to claim 3, wherein the controller is configured or programmed to:

shift, when all the three-phase duty command values rearranged in ascending order are the same, the first duty command value by the shift amount in the descending direction and shifts the third duty command value by the shift amount in the ascending direction; and shift the first duty command value of the three-phase duty command values updated at the second update timing by the shift amount in the ascending direction and shifts the third duty command value by the shift amount in the descending direction.

5. The motor control device according to claim 1, wherein when the three-phase duty command value updated at the first update timing is saturated, the controller is configured or programmed not to execute shift processing of the three-phase duty command values updated at the first update timing.

6. The motor control device according to claim 1, wherein the three-phase motor includes:

a rotor; and a rotor bearing that is a bearing component of the rotor.

* * * * *